US012748826B2

(12) United States Patent
Kobayashi et al.

(10) Patent No.: US 12,748,826 B2
(45) Date of Patent: Sep. 29, 2026

(54) METHOD FOR MANAGING AUTHORITY TO ENTER FOR A POWER SUPPLY VEHICLE

(71) Applicant: TOYOTA JIDOSHA KABUSHIKI KAISHA, Toyota (JP)

(72) Inventors: Ryosuke Kobayashi, Nagakute (JP); Koichi Watanabe, Tokyo-to (JP); Motofumi Kamiya, Nagoya (JP); Masaki Nishino, Anjo (JP); Jean-Sebastien Boire, Yokohama (JP); Takuya Nishioka, Nagoya (JP); Yohei Nakanishi, Nagoya (JP); Masaki Makihara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 18/639,960

(22) Filed: Apr. 19, 2024

(65) Prior Publication Data

US 2024/0354383 A1 Oct. 24, 2024

(30) Foreign Application Priority Data

Apr. 20, 2023 (JP) ................................ 2023-069561

(51) Int. Cl.

*G06F 21/31* (2013.01)
*G06Q 10/02* (2012.01)
*G06Q 30/0283* (2023.01)

(52) U.S. Cl.

CPC ............ *G06F 21/31* (2013.01); *G06Q 10/02* (2013.01); *G06Q 30/0284* (2013.01); *G06F 2221/2111* (2013.01)

(58) Field of Classification Search

CPC . G06F 21/31; G06F 2221/2111; G06Q 10/02; G06Q 10/083; G06Q 30/0283; G06Q 30/0284; G06Q 50/06; G06Q 50/40; B60L 53/00; B60L 53/66; B60L 53/68; H02L 7/00; H02L 7/00032

USPC ........................................................ 713/182

See application file for complete search history.

(56) References Cited

U.S. PATENT DOCUMENTS 5,726,885 A * 3/1998 Klein .................... G08G 1/127 705/5
9,007,020 B2 * 4/2015 Prosser .................. B60L 53/53 320/109
10,494,205 B1 * 12/2019 Hoofard ............ B65G 69/2882
11,727,411 B2 * 8/2023 Matthews ............. G06Q 20/40 235/379
2010/0152976 A1 * 6/2010 White .................... B60R 25/25 700/79

(Continued)

FOREIGN PATENT DOCUMENTS

JP 2019086841 A 6/2019
JP 2021061071 A 4/2021

*Primary Examiner* — James N Fiorillo

(74) *Attorney, Agent, or Firm* — KENJA IP LAW PC

(57) ABSTRACT

An information processing apparatus receives a notification that a reservation for use of a charging service has been made by a user who uses a location among one or more locations, the charging service being a service in which a power supply vehicle charges a user vehicle at the location. The information processing apparatus then temporarily grants authority to enter the location to the power supply vehicle in a case in which a restriction on entering the location is provided.

4 Claims, 3 Drawing Sheets

(56) References Cited

U.S. PATENT DOCUMENTS

| | | | | |
|---|---|---|---|---|
| 2011/0144844 | A1* | 6/2011 | Ishibashi | B60L 53/65<br>320/109 |
| 2012/0299544 | A1* | 11/2012 | Prosser | H02J 7/342<br>320/109 |
| 2016/0300413 | A1* | 10/2016 | Robertson | G07C 9/00571 |
| 2017/0278311 | A1* | 9/2017 | Vespia | G06F 18/22 |
| 2019/0108700 | A1* | 4/2019 | Chelnik | G07B 15/02 |
| 2019/0126768 | A1* | 5/2019 | Niwa | G07C 5/004 |
| 2020/0180881 | A1* | 6/2020 | Hoofard | B65G 69/2882 |
| 2020/0242924 | A1* | 7/2020 | Publicover | G08G 1/087 |
| 2022/0305942 | A1* | 9/2022 | Mannepalli | B60L 53/60 |
| 2022/0379762 | A1* | 12/2022 | Akhavan-Tafti | B60L 53/12 |
| 2024/0239222 | A1* | 7/2024 | Yamada | B60L 53/37 |
| 2024/0265714 | A1* | 8/2024 | Franc | G06Q 10/10 |
| 2024/0278678 | A1* | 8/2024 | Kobayashi | B60L 53/57 |
| 2024/0303762 | A1* | 9/2024 | Kobayashi | G06Q 50/40 |
| 2024/0343153 | A1* | 10/2024 | Kobayashi | B60L 53/68 |
| 2024/0383365 | A1* | 11/2024 | Nagata | B60L 53/66 |

* cited by examiner

METHOD FOR MANAGING AUTHORITY TO ENTER FOR A POWER SUPPLY VEHICLE

CROSS-REFERENCE TO RELATED APPLICATION

This application claims priority to Japanese Patent Application No. 2023-069561 filed on Apr. 20, 2023, the entire contents of which are incorporated herein by reference.

TECHNICAL FIELD

The present disclosure relates to a method.

BACKGROUND

Technology for supplying power by a power supply vehicle when, for example, an electric vehicle runs out of electricity is known. For example, Patent Literature (PTL) 1 discloses technology in which a vehicle that has run out of electricity transmits information including the current position of the vehicle to a server and each of multiple power supply vehicles transmits information including position of each power supply vehicle to the server, whereby the server selects a power supply vehicle to supply power to the vehicle that has run out of electricity.

CITATION LIST

Patent Literature

PTL 1: JP 2019-086841 A

SUMMARY

There is room for improvement with respect to technology for supplying power by power supply vehicles.

It would be helpful to improve technology for supplying power by power supply vehicles.

A method according to an embodiment of the present disclosure is a method performed by an information processing apparatus that manages authority to enter one or more locations, the method including:

- receiving a notification that a reservation for use of a charging service has been made by a user who uses a location among the one or more locations, the charging service being a service in which a power supply vehicle charges a user vehicle at the location; and
- temporarily granting first authority to enter the location to the power supply vehicle in a case in which a restriction on entering the location is provided.

According to an embodiment of the present disclosure, technology for supplying power by power supply vehicles is improved.

DETAILED DESCRIPTION

Hereinafter, an embodiment of the present disclosure will be described.

Outline of Embodiment

Figure 1:
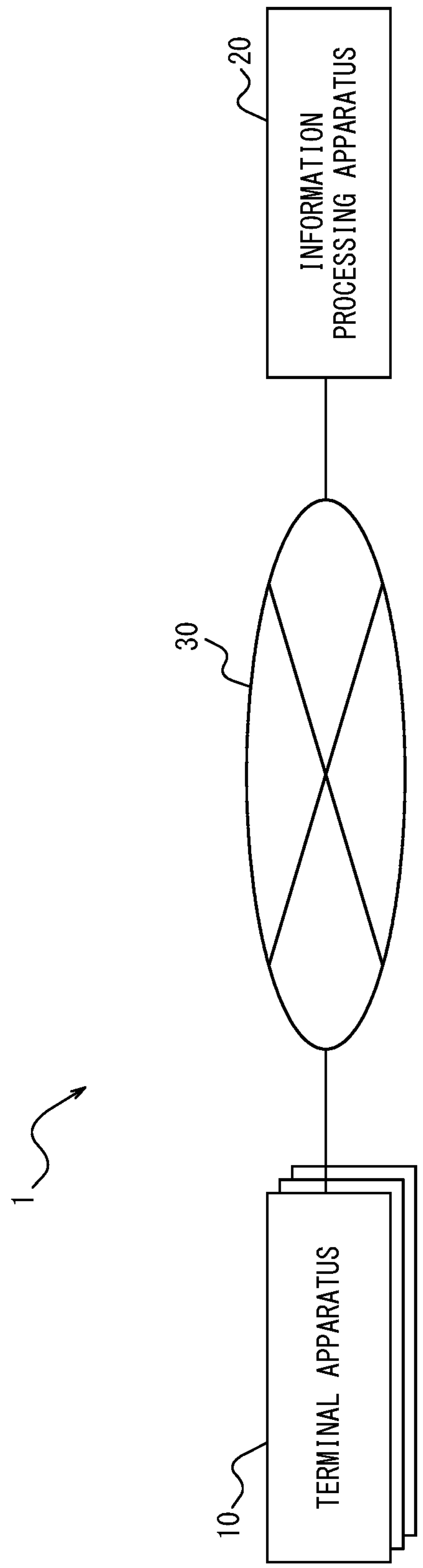
FIG. 1 is a block diagram illustrating a schematic configuration of a system according to an embodiment of the present disclosure.

An outline of a system 1 according to an embodiment of the present disclosure will be described with reference to FIG. 1. The system 1 includes a plurality of terminal apparatuses 10 and an information processing apparatus 20. Each terminal apparatus 10 and the information processing apparatus 20 are communicably connected to a network 30 including, for example, the Internet, a mobile communication network, or the like.

The terminal apparatuses 10 are computers, such as personal computers (PCs), smartphones, or tablet terminals, for example. In the present embodiment, the terminal apparatuses 10 are each used, for example, by a user who uses a service that dispatches the power supply vehicle to a location designated by the user and supplies power to the vehicle of the user at the location (hereinafter also referred to as "rush charging service"). The terminal apparatuses 10 may each be a computer mounted in a vehicle.

The information processing apparatus 20 is, for example, a computer such as a server apparatus. The information processing apparatus 20 can communicate with the plurality of terminal apparatuses 10 via the network 30. In the present embodiment, the information processing apparatus 20 may be a server of a parking operator, for example, that manages authority to enter one or more locations.

First, an outline of the present embodiment will be described, and details thereof will be described later. The information processing apparatus 20 receives a notification that a reservation for use of a charging service has been made by a user who uses a location among the one or more locations, the charging service being a service in which the power supply vehicle charges the user vehicle at the location. The information processing apparatus 20 then temporarily grants the first authority to enter the location to the power supply vehicle, if a restriction on entry to the location is provided.

Thus, according to the present embodiment, when a power supply vehicle is to supply power at a location where a restriction on entering is provided, the information processing apparatus 20 temporarily grants authority to enter the location to the power supply vehicle. This simplifies the procedure for acquiring authority for the power supply vehicle to enter the location. Therefore, according to the present embodiment, the technology of supplying power by a power supply vehicle is improved in that the procedure for providing rush charging service by a power supply vehicle can be simplified.

Next, configurations of the system 1 will be described in detail.

(Configuration of Terminal Apparatus)

Figure 2:
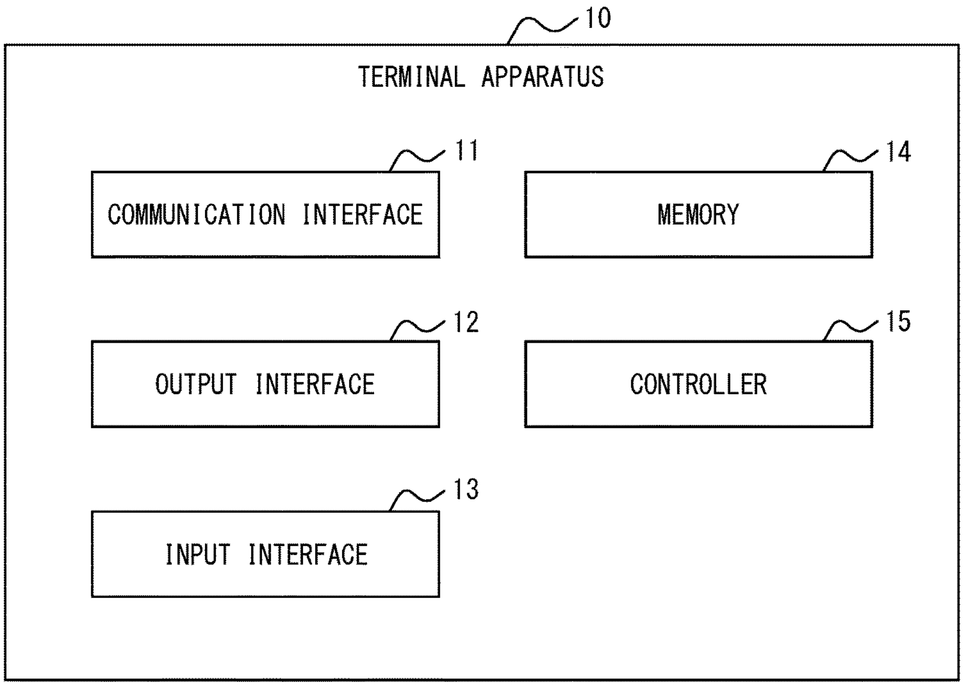
FIG. 2 is a block diagram illustrating a schematic configuration of a terminal apparatus.

As illustrated in FIG. 2, the terminal apparatus 10 includes a communication interface 11, an output interface 12, an input interface 13, a memory 14, and a controller 15.

The communication interface 11 includes at least one communication interface for connecting to the network. The interface for communication is compliant with mobile communication standards such as the 4th generation (4G) standard or the 5th generation (5G) standard, for example, but these examples are not limiting. In the present embodiment, the terminal apparatus 10 communicates with the information processing apparatus 20 via the communication interface 11 and the network 30.

The output interface 12 includes at least one output device for outputting information. The output device is a display for outputting information as video, a speaker for outputting information as audio, or the like, for example, but is not limited to these. Alternatively, the output interface 12 may include an interface for connecting to an external output device.

The input interface 13 includes at least one input device for detecting an input operation by the user. The input device is a physical key, a capacitive key, a mouse, a touch panel, a touch screen integrally provided with a display of the output interface 12, a microphone, or the like, for example, but is not limited to these. Alternatively, the input interface 13 may include an interface for connecting to an external input device.

The memory 14 includes one or more memories. The memories are semiconductor memories, magnetic memories, optical memories, or the like, for example, but are not limited to these. The memories included in the memory 14 may each function as, for example, a main memory, an auxiliary memory, or a cache memory. The memory 14 stores any information to be used for operations of the terminal apparatus 10. For example, the memory 14 may store a system program, an application program, embedded software, and the like. The information stored in the memory 14 may be updated with, for example, information acquired from the network 30 via the communication interface 11.

The controller 15 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 15 controls the operations of the entire terminal apparatus 10.

(Configuration of Information Processing Apparatus)

Figure 3:
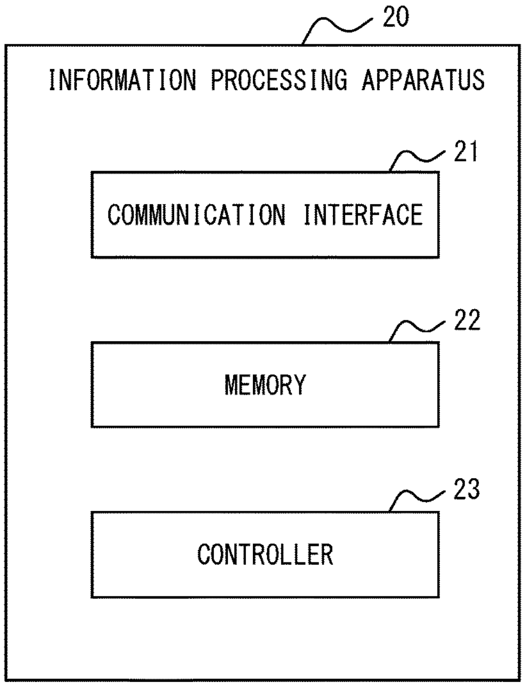
FIG. 3 is a block diagram illustrating a schematic configuration of an information processing apparatus.

As illustrated in FIG. 3, the information processing apparatus 20 includes a communication interface 21, a memory 22, and a controller 23.

The communication interface 21 includes at least one communication interface for connecting to the network 30. The communication interface may be compliant with, for example, mobile communication standards, wired local area network (LAN) standards, or wireless LAN standards, but these examples are not limiting. The communication interface may be compliant with any appropriate communication standards. In the present embodiment, the information processing apparatus 20 communicates with the plurality of terminal apparatuses 10 via the communication interface 21 and the network 30.

The memory 22 includes one or more memories. The memories included in the memory 22 may each function as, for example, a main memory, an auxiliary memory, or a cache memory. The memory 22 stores any information used for operations of the information processing apparatus 20. For example, the memory 22 may store a system program, an application program, embedded software, a database, and the like. The information stored in the memory 22 may be updated with, for example, information acquired from the network 30 via the communication interface 21.

The controller 23 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 23 controls the operations of the entire information processing apparatus 20.

(Flow of Operations of Information Processing Apparatus)

Figure 4:
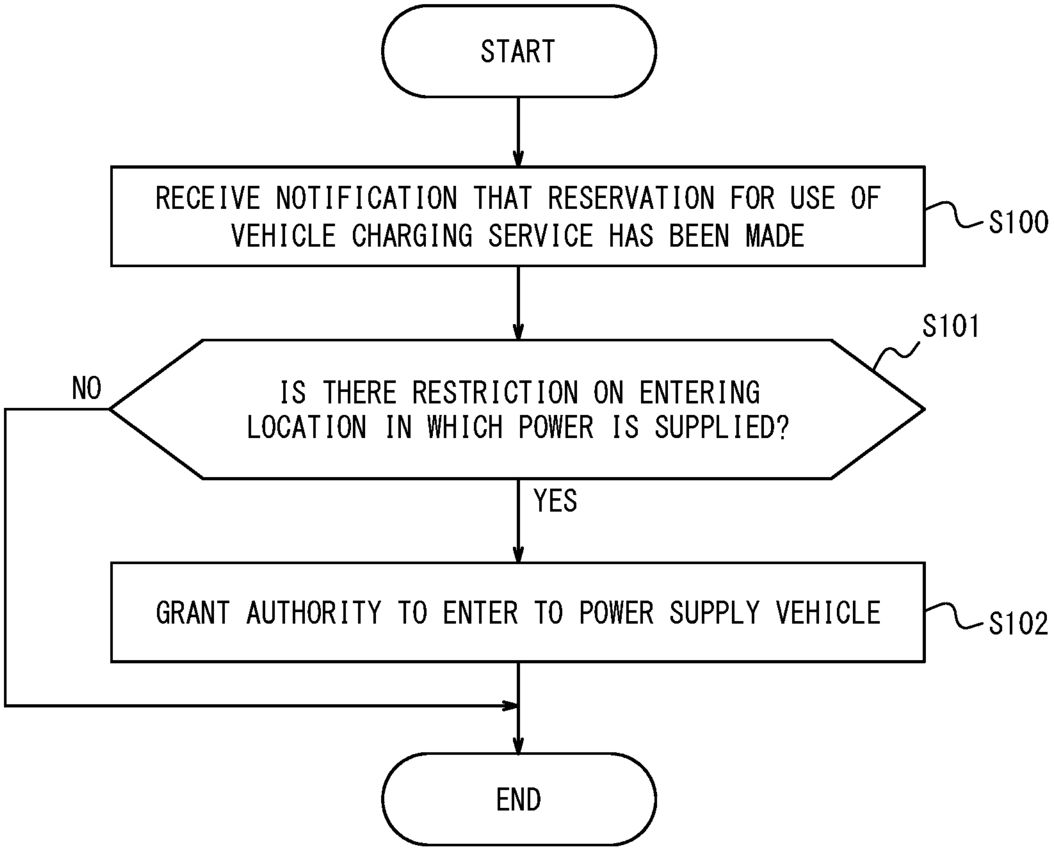
FIG. 4 is a flowchart illustrating operations of the information processing apparatus.

Operations of the information processing apparatus 20 according to the present embodiment will be described with reference to FIG. 4.

Step S100: The controller 23 of the information processing apparatus 20 receives a notification that a reservation for use of the charging service has been made by a user who uses a location among one or more locations for which the information processing apparatus 20 manages authority to enter, the charging service being a service in which the power supply vehicle charges the user vehicle at the location.

For example, a user who has made a reservation for use of the rush charging service enters the first reservation information for the charging service, which is information about having made a reservation for use of the rush charging service, when using the terminal apparatus 10 to make a reservation for a location (e.g., a parking lot) for which the information processing apparatus 20 manages authority to enter. For example, the user may be allowed to input the first reservation information for the charging service on the screen for inputting the second reservation information for the location, which is the information about the reservation for that location displayed on the terminal apparatus 10. The terminal apparatus 10 transmits the first reservation information for the charging service together with the second reservation information for the location to the information processing apparatus 20. The controller 23 of the information processing apparatus 20 receives the first reservation information for the charging service and the second reservation information for the location from the terminal apparatus 10 via the communication interface 21 as a notification that a reservation for use of the charging service in which the power supply vehicle charges the user vehicle at the location has been made. However, any method can be employed, including but not limited to the example above, where the first reservation information for charging service is not entered together with the second reservation information for the location, but independently.

The "first reservation information for charging service" includes, but is not limited to, the reserved time period for charging service and identification information of the charging service provider (e.g., ID or provider name), and may also include any information related to the reservation, such as location information (e.g., address, latitude and longitude, or facility name). If the first reservation information for the charging service includes information indicating the location, the controller 23 may use only the first reservation information for the charging service as a notification that a reservation for use of the charging service in which the power supply vehicle charges the user vehicle at that location has been made.

The "second reservation information for the location" may include, but is not limited to, the reservation time period for the location and information indicating the location (e.g., address, latitude and longitude, or facility name), and may include any information related to the reservation of the location.

Step S101: The controller 23 determines if there are any restrictions on entry to the location in question. If it is determined that there are restrictions on entry to the location in question (step S101—Yes), the process proceeds to step S102; if it is determined that there are no restrictions (step S101—No), the process ends.

Specifically, the memory 22 stores information on admission to each location in advance. The "location admission information" includes, for example, but is not limited to, information indicating that there are restrictions on admission to the location and information indicating the admission fee to the location, and may include any information regarding admission to the location. The controller 23 determines whether or not there are restrictions on entry to the location based on said information stored in the memory 22 of the information processing apparatus 20. If it is determined that there are restrictions on entry to the location in question (step S102—Yes), the process proceeds to step S103; if it is determined that there are no restrictions (step S102—No), the process ends.

Step S102: If it is determined in step S101 that a restriction on entry to the location is provided (step S101—Yes), the controller 23 temporarily grants the first authority to enter the location to the power supply vehicle.

Specifically, if it is determined in step S101 that a restriction on entry to the location is provided (step S101—Yes), the controller 23 temporarily grants the first authority to enter the location by, for example, issuing the first identification information to be used when the power supply vehicle enters the location. The controller 23 may notify the driver of the power supply vehicle of the first identification information.

The "first identification information" may include any information that allows the controller 23 to determine that the power supply vehicle is granted first authority to enter the location based on the first identification information, such as, for example, a unique ID and/or password assigned to the power supply vehicle or the rush charging service provider.

The first identification information may be used when the power supply vehicle enters the location. For example, when a power supply vehicle enters the location, the controller 23 receives the first identification information from the power supply vehicle and permits the power supply vehicle to enter the location based on the first identification information.

Any method can be employed to receive the first identification information. For example, the controller 23 may receive, via the communication interface 21 and the network 30, the first identification information read by a device equipped with an IC card reader installed at the entrance of the location, or the first identification information entered by the driver of the power supply vehicle using the terminal apparatus 10 and network 30.

As described above, the information processing apparatus 20 receives a notification that a reservation for use of a charging service has been made by a user who uses a location among the one or more locations, the charging service being a service in which a power supply vehicle charges a user vehicle at the location. The information processing apparatus 20 then temporarily grants the first authority to enter the location to the power supply vehicle, if a restriction on entry to the location is provided.

According to this configuration, when a power supply vehicle supplies power at a location where there are restrictions on entry, the information processing apparatus 20 temporarily grants the power supply vehicle authority to enter the location. This simplifies the procedure for acquiring authority for the power supply vehicle to enter the location. Thus, the technology of powering by a power supply vehicle is improved in that the procedure for providing rush charging service by the power supply vehicle can be simplified.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the configuration and operations of the information processing apparatus 20 in the above embodiment are distributed to multiple computers capable of communicating with each other can be implemented. For example, an embodiment in which some or all of the components of the information processing apparatus 20 are provided in the terminal apparatus 10, or in another information processing apparatus (e.g., a server of a rush charging service provider) that can communicate with the information processing apparatus 20 via the network 30 is also possible. For example, the terminal apparatus 10 may have some or all of the components of the information processing apparatus 20, and the server of the rush charging service provider may have some or all of the components of the information processing apparatus 20.

For example, it is also possible to have variation without step S101 in the embodiment described above. For example, the controller 23 may proceed to step S102 after executing step S100.

For example, in the embodiment described above, the controller 23 may determine whether the user vehicle has entered the location and, if it is determined that the user vehicle has not entered the location, temporarily grant the second authority to enter the location to the user vehicle. Specifically, for example, the controller 23 may use GPS to determine whether the user vehicle has entered the location. Alternatively, the controller 23 may determine whether the user vehicle has entered the location by also receiving information about whether the user vehicle has entered the location when receiving a notification that a reservation for use of the charging service in which the power supply vehicle charges the user vehicle at the location has been made. If it is determined that the user vehicle has not been admitted to the location, the controller 23 temporarily grants the user vehicle a second authority to enter the location, for example, by issuing a second identification information to be used when the user vehicle enters the location. The controller 23 may notify the user of the second identification information. The second authority to enter the location granted to the user vehicle may be the same as or different from the first authority.

The "second identification information" may include any information, such as, for example, a unique ID and/or password assigned to the user vehicle, that allows the controller 23 to determine that the user vehicle has been granted second authority to enter the location based on the second identification information.

The second identification information may be used when the user vehicle enters the location. For example, when the user vehicle enters the location, the controller 23 receives the second identification information from the user vehicle and permits the user vehicle to enter the location based on the second identification information. Any method for receiving the second identification information can be adopted in the same way as the method for receiving the first identification information.

For example, in the embodiment described above, if payment of a fee is required upon entering or exiting the location, the controller 23 may charge a second fee that is lower than the first fee charged to the user vehicle to the power supply vehicle.

For example, in the embodiment described above, if payment of a fee is required upon entering or exiting the location, the controller 23 may be set to charge only the user vehicle a fee and not charging the power supply vehicle a fee. Specifically, if payment of a fee is required upon entering or exiting the location, the controller 23 may, for example, charge the user vehicle a fee so that the user pays the fee charged to the power supply vehicle together with the fee charged to the user vehicle.

For example, an embodiment in which a general purpose computer functions as the information processing apparatus 20 according to the above embodiment can also be implemented. Specifically, a program in which processes for realizing the functions of the information processing apparatus 20 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. A method performed by an information processing apparatus that comprises a controller, a memory, and a communication interface and manages authority to enter one or more locations, the method comprising:

storing, by the controller in a database in the memory, location admission information indicating whether each of the one or more locations has a restriction on entering;

receiving, by the controller via the communication interface, a notification that a reservation for use of a charging service has been made by a user who uses a location among the one or more locations, the charging service being a service in which a power supply vehicle charges a user vehicle at the location;

temporarily granting, by the controller, first authority to enter the location to the power supply vehicle in a case in which the location admission information indicates that a restriction on entering the location is provided by a device installed at an entrance of the location;

receiving, by the controller via the communication interface, first identification information associated with the first authority granted to the power supply vehicle when the power supply vehicle enters the location;

causing, by the controller via the communication interface, the device to permit the power supply vehicle to enter the location based on the first identification information; and in a case in which payment of a fee is required upon entering or exiting the location, charging, by the controller, the fee only to the user vehicle and not to the power supply vehicle, wherein the first identification information includes a unique ID and password assigned to the power supply vehicle or a provider of the charging service.

2. The method according to claim 1, further comprising:

temporarily granting, by the controller, second authority to enter the location to the user vehicle in a case in which the user vehicle has not entered the location;

receiving, by the controller via the communication interface, second identification information associated with the second authority granted to the user vehicle when the user vehicle enters the location; and causing, by the controller via the communication interface, the device to permit the user vehicle to enter the location based on the second identification information.

3. The method according to claim 1, wherein the notification includes first reservation information including information related to the reservation for use of the charging service and second reservation information including information about the reservation for the location.

4. A method performed by an information processing apparatus that comprises a controller, a memory, and a communication interface and manages authority to enter one or more locations, the method comprising:

storing, by the controller in a database in the memory, location admission information indicating whether each of the one or more locations has a restriction on entering;

receiving, by the controller via the communication interface, a notification that a reservation for use of a charging service has been made by a user who uses a location among the one or more locations, the charging service being a service in which a power supply vehicle charges a user vehicle at the location;

temporarily granting, by the controller, first authority to enter the location to the power supply vehicle in a case in which the location admission information indicates that a restriction on entering the location is provided by a device installed at an entrance of the location;

receiving, by the controller via the communication interface, first identification information associated with the first authority granted to the power supply vehicle when the power supply vehicle enters the location;

causing, by the controller via the communication interface, the device to permit the power supply vehicle to enter the location based on the first identification information; and in a case in which payment of a fee is required upon entering or exiting the location, charging, by the controller, a first amount of the fee to the user vehicle and a second amount of the fee to the power supply vehicle, the second amount being lower than the first amount, wherein the first identification information includes a unique ID and password assigned to the power supply vehicle or a provider of the charging service.

* * * * *